United States Patent
Liang (10) Patent No.: US 8,406,018 B2
(45) Date of Patent: Mar. 26, 2013

(54) SERIES RESONANT CONVERTER WITH OVERLOAD DELAY AND SHORT-CIRCUIT PROTECTION MECHANISMS

(75) Inventor: Jim-Hung Liang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 395 days.

(21) Appl. No.: 12/801,132

(22) Filed: May 25, 2010

(65) Prior Publication Data

US 2011/0228566 A1  Sep. 22, 2011

(30) Foreign Application Priority Data

Mar. 22, 2010  (TW) .............................. 99108298 A (51) Int. Cl.
*H02M 3/335* (2006.01)
*H02H 7/122* (2006.01)

(52) U.S. Cl. ................ 363/56.04; 363/21.02; 363/56.03

(58) Field of Classification Search ............... 363/21.02, 363/21.03, 56.02–56.04
See application file for complete search history.

(56) References Cited

U.S. PATENT DOCUMENTS

| | | | | |
|---|---|---|---|---|
| 7,313,004 B1 * | 12/2007 | Yang et al. | ................. | 363/21.02 |
| 7,375,987 B2 * | 5/2008 | Kyono | ....................... | 363/21.02 |
| 7,881,082 B2 * | 2/2011 | Sato | ............................... | 363/97 |
| 8,027,174 B2 * | 9/2011 | Ryu et al. | ......................... | 363/16 |
| 2001/0036090 A1 * | 11/2001 | Halberstadt | ................ | 363/21.02 |
| 2008/0137381 A1 * | 6/2008 | Beasley | ...................... | 363/21.02 |
| 2008/0266908 A1 * | 10/2008 | Halberstadt | ................ | 363/21.02 |
| 2010/0020569 A1 * | 1/2010 | Melanson et al. | ......... | 363/21.03 |
| 2010/0172157 A1 * | 7/2010 | Chen et al. | ................. | 363/21.02 |
| 2010/0290256 A1 * | 11/2010 | Zhou et al. | ................ | 363/21.02 |

* cited by examiner

*Primary Examiner* — Adolf Berhane
*Assistant Examiner* — Gary Nash
(74) *Attorney, Agent, or Firm* — Bacon & Thomas, PLLC (57) ABSTRACT

The present invention is to provide a series resonant converter with an overload delay and short-circuit protection mechanism, which includes a voltage sensing circuit for sensing a voltage ripple level on a primary side of a transformer thereof, that corresponds to a load on a secondary side of the transformer, and generating and sending a DC detection level to an overload delay circuit and a short-circuit protection circuit thereof accordingly. The overload delay circuit and the short-circuit protection circuit are able control the converter through a resonant controller chip to output different currents according to magnitude of the load on the secondary side and maintain stable operation for a predetermined delay time even if the secondary side is overloaded, however, once the secondary side is short-circuited, the converter is turned off instantly. Thus, the converter is effectively prevented from damage which may otherwise result from sustained overload or short circuit.

15 Claims, 13 Drawing Sheets

SERIES RESONANT CONVERTER WITH OVERLOAD DELAY AND SHORT-CIRCUIT PROTECTION MECHANISMS

FIELD OF THE INVENTION

The present invention relates to a series resonant converter, more particularly to a series resonant converter with an overload delay and short-circuit protection mechanism, which not only can output different currents according to magnitude of a load on a secondary side thereof, but also can continue operating for a predetermined delay time even if the secondary side is overloaded. However, should the load on the secondary side be short-circuited, the converter is instantly turned off and hence effectively protected from overheating or damage which may otherwise result from the short circuit.

BACKGROUND OF THE INVENTION

Figure 1:
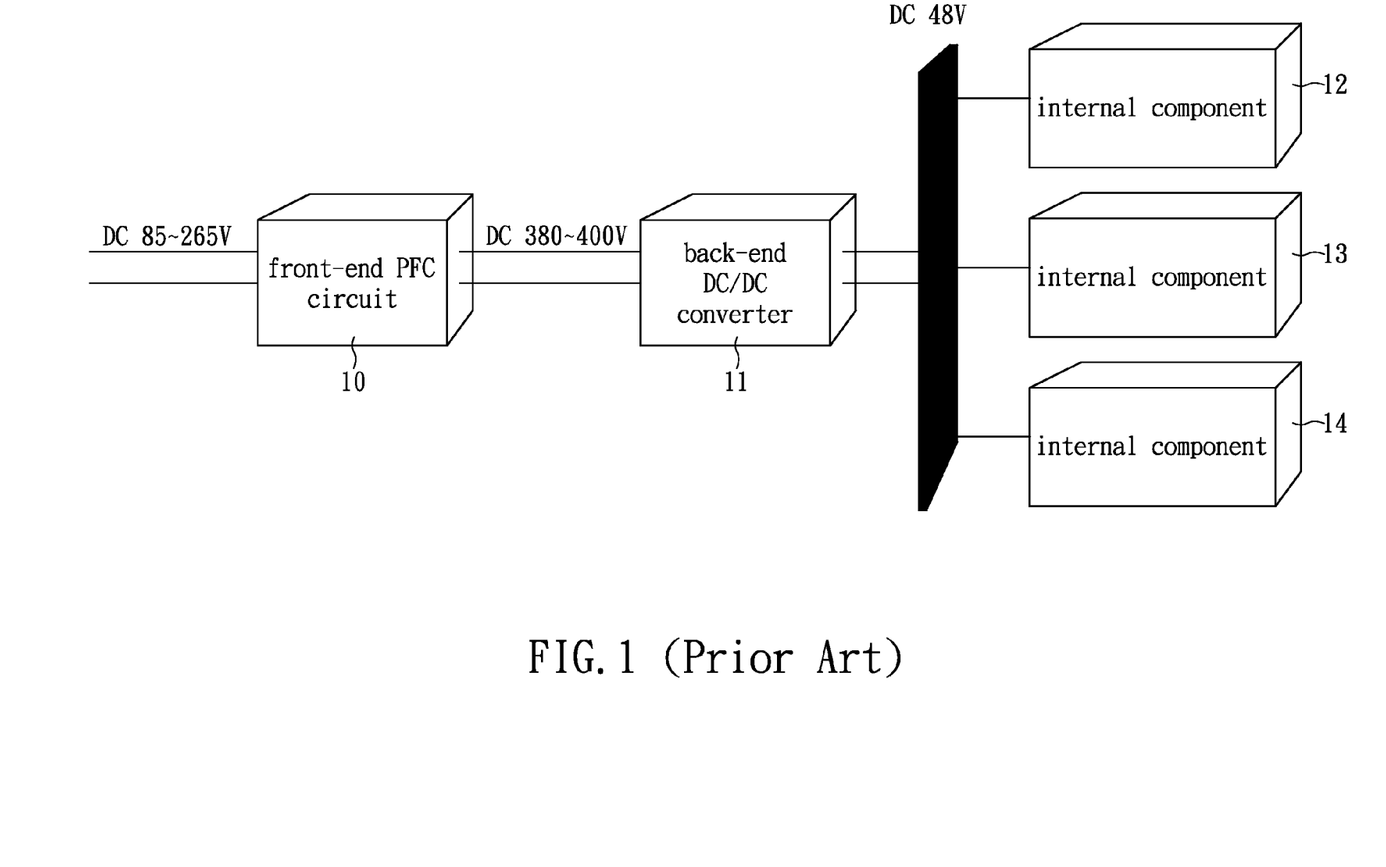
FIG. 1 schematically shows the structure of a conventional distributed voltage regulation system.

Nowadays, the distributed voltage regulation (or distributed power supply) system, which has such advantages as high efficiency, high reliability, and a highly flexible input voltage range, is widely used as the power supply system of computers, computer peripherals, and many electronic instruments. As shown in FIG. 1, the circuit structure of a DPS system includes a front-end power factor correction (PFC) circuit 10 and a back-end DC/DC converter 11. The front-end PFC circuit 10 is a step-up circuit configured mainly for eliminating the harmonics of an AC input voltage of 85~265V so as to obtain a stable DC voltage of 380~400V. The back-end DC/DC converter 11, on the other hand, is configured mainly for isolating the DC voltage into DC voltages of different magnitudes for use by the internal components 12, 13, and 14 of an equipment or instrument.

Generally speaking, referring again to FIG. 1, in designing the front-end PFC circuit 10, a sufficient power supply hold-up time must be ensured so that a switched-mode power supply will not be shut down when an input AC power supply is turned off (or on) instantaneously. Furthermore, in designing the back-end DC/DC converter 11, it is necessary to ensure activation under high input voltage, and in order to stay efficient under high input voltage, power loss must also be minimized. These requirements, however, are not readily met by conventional DC/DC converters. Take the traditional pulse-width modulation (PWM) converter for example. A high input voltage not only lowers conversion efficiency but also makes a wide output voltage range unattainable. Moreover, as the power devices (e.g., metal-oxide-semiconductor field-effect transistors, or MOSFETs) of a conventional PWM converter are used as switches, and energy is delivered by means of switching, switching loss and electromagnetic interference (EMI) tend to aggravate as the switching frequencies in a unit time continuously increase.

To solve the aforesaid problems, resonant converters based on the soft-switching technology have emerged. The main principle of a resonant converter is to add such elements as resonant inductors and resonant capacitors to the primary side of a transformer via series-connection, parallel-connection, or series-parallel connection. Hence, by virtue of a resonant controller chip and the principles of resonance, power devices in the resonant converter are capable of zero-voltage or zero-current switching. As a result, the switching loss of the power devices is reduced, and the overall conversion efficiency enhanced. Recently, with the advancement of manufacturing techniques for resonant controller chips and power devices, and coupled with their declining prices, resonant converters have become increasingly popular in the industry and are extensively used in various types of electronic equipment and instruments. In particular, series resonant converters are especially favored for their high input voltage, high efficiency, and a wide output voltage range.

Figure 2:
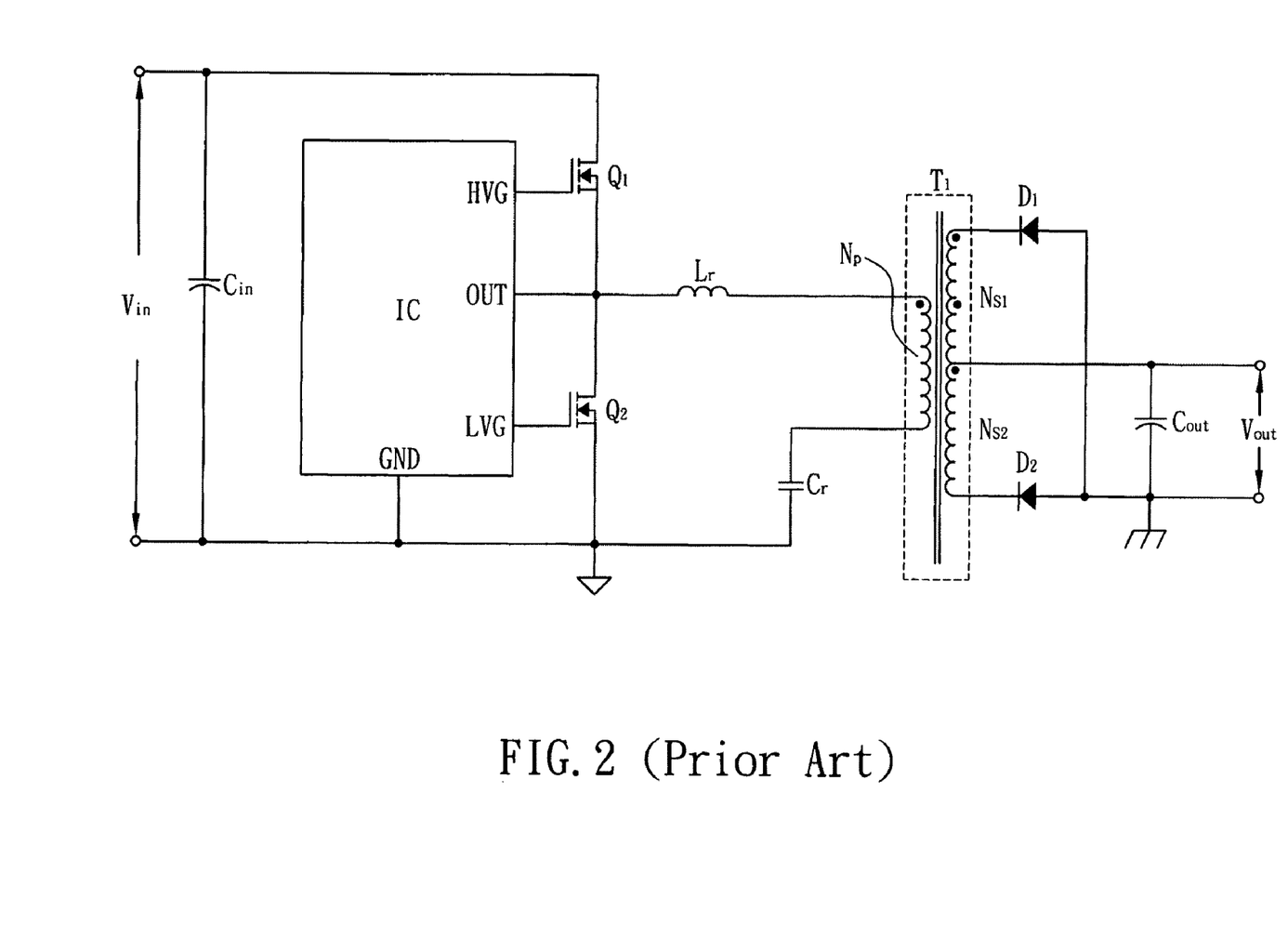
FIG. 2 is a schematic circuit diagram of a conventional series resonant converter.

Referring to FIG. 2, a series resonant converter commonly used in the industry typically includes an input voltage filter capacitor $C_{in}$; a resonant controller chip IC; a first power switch $Q_1$; a second power switch $Q_2$; a resonant inductor $L_r$; a resonant capacitor $C_r$; a transformer $T_1$; two secondary rectifier diodes $D_1$, $D_2$; and an output voltage filter capacitor $C_{out}$. The input voltage filter capacitor $C_{in}$ is connected across the positive and negative ends of an input voltage $V_{in}$. The first power switch $Q_1$ and the second power switch $Q_2$ are series-connected to each other and parallel-connected to the input voltage filter capacitor $C_{in}$. The gate of the first power switch $Q_1$ and the gate of the second power switch $Q_2$ are connected to the corresponding control pins of the resonant controller chip IC, respectively. For instance, if the resonant controller chip IC is the high-voltage resonant controller ST L6599A produced by the world-famous chip manufacturer STMicroelectronics, the gates of the first and second power switches $Q_1$, $Q_2$ are connected to the control pins HVG and LVG of the resonant controller chip IC, respectively. In addition, the drain and the source of the first power switch $Q_1$ are connected to the positive electrode of the input voltage filter capacitor $C_{in}$ and the drain of the second power switch $Q_2$, respectively, while the source of the second power switch $Q_2$ is connected to the negative electrode of the input voltage filter capacitor $C_{in}$. Thus, the input voltage filter capacitor $C_{in}$ is capable of providing a stable input voltage to the transformer $T_1$. The transformer $T_1$ is configured mainly for isolation and includes a primary winding $N_p$ and two secondary windings $N_{S1}$, $N_{S2}$. The primary winding $N_p$ has one end connected to the positive electrode of the resonant capacitor $C_r$ and the other end connected to the corresponding sensing pin OUT of the resonant controller chip IC via the resonant inductor $L_r$ and the line between the two power switches $Q_1$, $Q_2$. The negative electrode of the resonant capacitor $C_r$ is connected to the source of the second power switch $Q_2$. The secondary winding $N_{S1}$ has one end connected to the positive electrode of the output voltage filter capacitor $C_{out}$ and the other end connected to the negative end of the secondary rectifier diode $D_1$. Similarly, the secondary winding $N_{S2}$ has one end connected to the positive electrode of the output voltage filter capacitor $C_{out}$ and the other end connected to the negative end of the secondary rectifier diode $D_2$. The positive ends of the secondary rectifier diodes $D_1$, $D_2$ are connected to the negative electrode of the output voltage filter capacitor $C_{out}$, respectively. Thus, the output voltage filter capacitor $C_{out}$ is capable of providing a stable DC output voltage $V_{out}$ to the load connected across the output ends. The working principle of such a conventional series resonant converter is briefly stated as follows. By virtue of the impedance properties of the resonant inductor $L_r$ and the resonant capacitor $C_r$ series-connected on the primary side, the resonant controller chip IC controls the switching frequencies of the two power switches $Q_1$, $Q_2$ and thereby enables the series resonant converter to provide a stable output voltage according to the load connected across the output ends.

Figure 3:
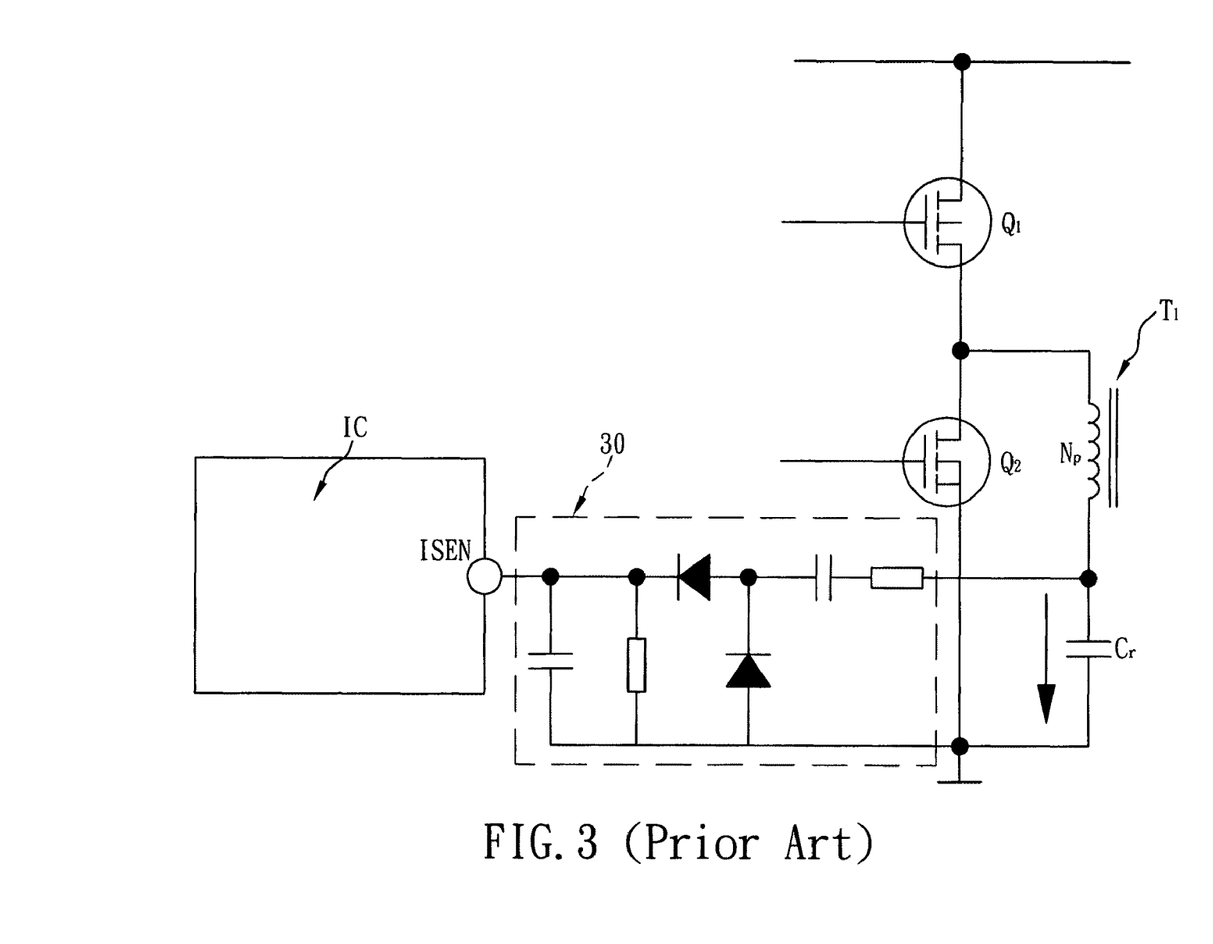
FIG. 3 is a schematic circuit diagram of a conventional series resonant converter with a detection circuit on the primary side.
Figure 4:
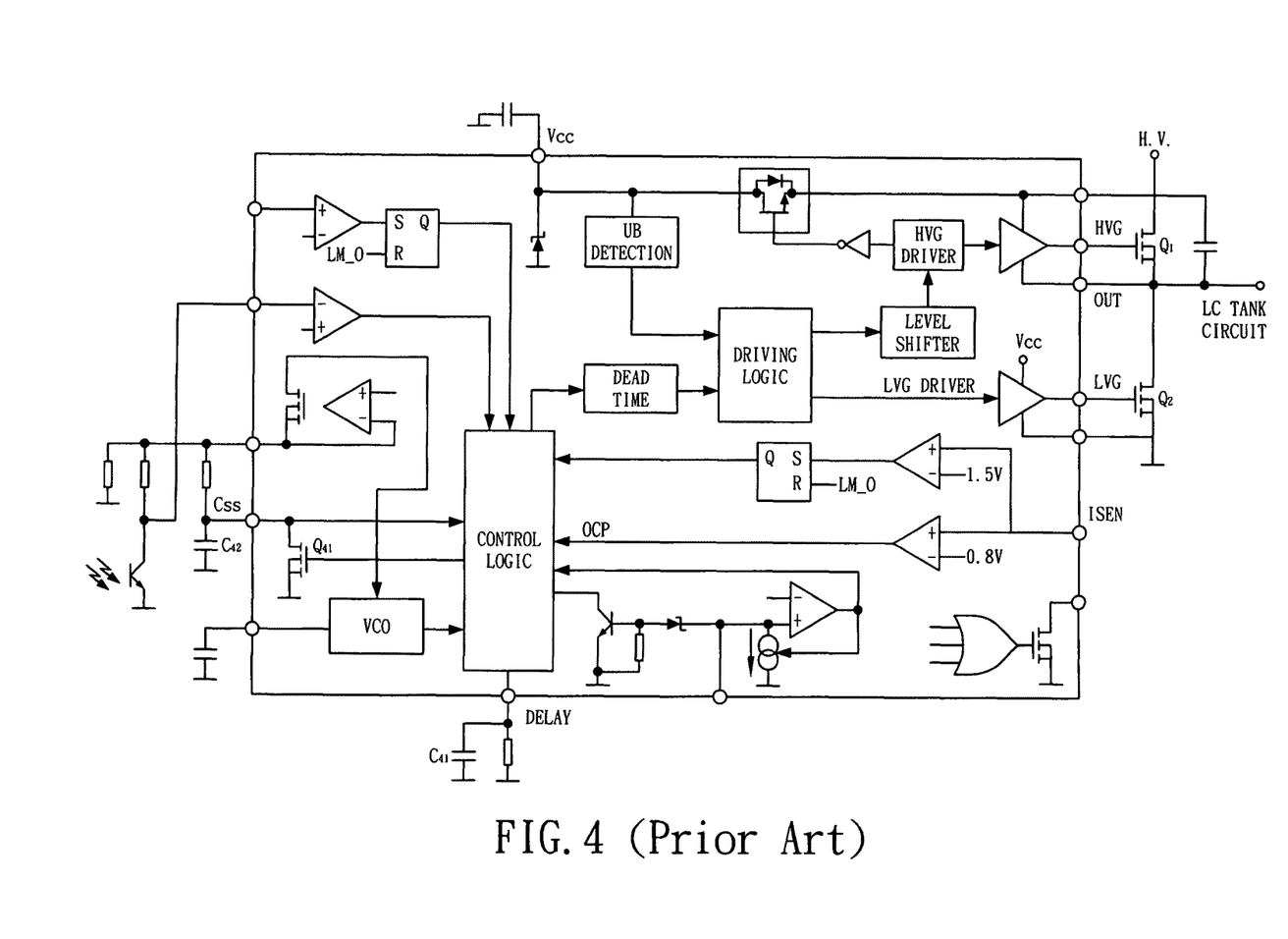
FIG. 4 is a schematic circuit diagram of the high-voltage resonant controller ST L6599A manufactured by STMicroelectronics.

Traditionally, referring again to FIG. 2, the conventional series resonant converter is so designed that it can operate in a particular peak-load state, with a view to being applicable to a variety of electronic instruments that tend to generate temporary peak loads. For instance, a series resonant converter with a rated load of 100 W is often designed to be operable under a peak load of 200 W. However, such an expedient design is intended only to enable a series resonant converter, under the conditions of low design and production costs, to provide the high power required for an electronic instrument to activate certain special functions that cause temporary peak loads, such as the temporary peak load occurring when a facsimile machine starts its heat sensor. To prevent the series resonant converter from overheating or damage which may otherwise occur due to continuous operation in the peak-load state, a conventional solution is to add a detection circuit 30 to the primary side of the series resonant converter, as shown in FIG. 3, wherein the detection circuit 30 is configured for sampling a voltage ripple of the resonant capacitor $C_r$. This is because the higher the load at the output ends on the secondary side of the series resonant converter is, the larger the voltage ripple sampled by the detection circuit 30 will be. After the two rectifier diodes in the detection circuit 30 perform full-wave rectification on the sampled voltage ripple, a DC detection level in proportion to the magnitude of the load on the secondary side is obtained. The detection circuit 30 then transmits the DC detection level to an over-current detection pin ISEN of the resonant controller chip IC. Referring to FIG. 4, if the resonant controller chip IC is the high-voltage resonant controller ST L6599A manufactured by STMicroelectronics, a comparator OCP in the resonant controller chip IC compares the DC detection level with a reference level (e.g., 0.8V). Therefore, if the over-current detection pin ISEN of the resonant controller chip IC detects that the DC detection level exceeds the 0.8V reference level of the comparator, meaning that the series resonant converter is operating in the peak-load state, the comparator OCP will send a control signal to a control circuit Control Logic in the resonant controller chip IC. Consequently, the control circuit Control Logic starts to charge a first external capacitor $C_{41}$ through a delay pin DELAY of the resonant controller chip IC. In other words, delay timing of the peak load begins. Meanwhile, the control circuit Control Logic turns on a switch $Q_{41}$ in the resonant controller chip IC so as to discharge a second external capacitor $C_{42}$ through a discharge pin $C_{SS}$ of the resonant controller chip IC, thereby increasing the operating frequency. As a result, the output power of the series resonant converter is lowered instantly.

However, although the high-voltage resonant controller ST L6599A of STMicroelectronics, when serving as the resonant controller chip IC, has an overload protection mechanism, activation of this overload protection mechanism will cause the operating frequencies of the two power switches Q1, Q2 to rise at the same time, thus limiting the output power of the series resonant converter immediately. Should that happen, the series resonant converter will be unable to maintain the high power required by the peak load at the output ends and therefore cannot provide the high power needed for an electronic instrument to temporarily activate certain special functions. In other words, the conventional series resonant converter cannot realize the mechanism that it should be turned off only after continuous operation in the peak-load state for a predetermined delay time. In addition to the high-voltage resonant controller ST L6599A made by STMicroelectronics, resonant controller chips with delay and power-limiting mechanisms include the high-voltage resonant controller TEA 1713 manufactured by the well-known chip manufacturer NXP Semiconductors. The high-voltage resonant controller TEA1713 has the same functional design as ST L6599A in that, when the resonant controller detects a peak load at the output ends of the series resonant converter, an internal timer starts to time, and the operating frequency is immediately increased such that the output power of the series resonant converter is instantly suppressed to a lower level.

It is apparent from the foregoing that the conventional series resonant converters simply cannot rely on commercially available resonant controller chips to realize the mechanism that the series resonant converters should be turned off only after it is operated continuously in the peak-load state for a predetermined delay time. As a result, many electronic instruments using the conventional series resonant converters tend to have problem in temporarily activating certain special functions that give rise to peak loads. Therefore, the issue to be addressed by the present invention is to make a series resonant converter by incorporating commercially available resonant controller chips into a simple circuit design that not only allows the series resonant converter to operate continuously in a peak-load state as needed, but also turns off the converter immediately after an electronic instrument using the converter successfully and temporarily activates certain special peak-load functions (i.e., after the series resonant converter is operated in the peak-load state for a predetermined delay time), thereby protecting the series resonant converter from overheating or damage which may otherwise result from sustained overload.

BRIEF SUMMARY OF THE INVENTION

In view of the aforesaid shortcomings of the conventional series resonant converters, the inventor of the present invention put years of practical experience into research and experiment and finally succeeded in developing a series resonant converter with overload delay and short-circuit protection mechanisms. It is hoped that the present invention will enable series resonant converters to not only operate continuously in a peak-load state but also be turned off immediately after, and only after, the peak-load state continues for a predetermined delay time, thus preventing the series resonant converters from overheating or damage related to sustained overload.

It is an object of the present invention to provide a series resonant converter with an overload delay mechanism, wherein the series resonant converter includes an overload delay circuit, a voltage sensing circuit, a transformer, a resonant controller chip, and two primary-side power switches. The voltage sensing circuit is configured for sensing a voltage ripple level on the primary side of the transformer that corresponds to the load on the secondary side and generating a DC detection level accordingly. The overload delay circuit receives the DC detection level, starts timing upon determining that the DC detection level exceeds a first reference level, generates a first control signal when the DC detection level has exceeded the first reference level for a predetermined delay time, and sends the first control signal to the resonant controller chip. During the predetermined delay time, the resonant controller chip controls the operating frequencies of the primary-side power switches to increase the output power of the transformer and thereby allow an electronic instrument equipped with the series resonant converter to successfully and temporarily start certain special peak-load functions. However, if the overload delay circuit determines that the DC detection level remains higher than the first reference level after the predetermined delay time is up and sends out the first control signal, the resonant controller chip will, upon receiving the first control signal, turn off the converter at once. Thus, the series resonant converter is protected from overheating or damage attributable to sustained overload.

It is another object of the present invention to provide a series resonant converter with overload delay and short-circuit protection mechanisms, wherein the series resonant converter includes an overload delay circuit, a voltage sensing circuit, a transformer, a resonant controller chip, two primary-side power switches, and a short-circuit protection circuit. The voltage sensing circuit senses a voltage, ripple level of a resonant capacitor series-connected to the primary side of the transformer and generates a DC detection level accordingly. The overload delay circuit receives the DC detection level, starts timing upon determining that the DC detection level exceeds a first reference level, generates a first control signal when the DC detection level has exceeded the first reference level for a predetermined delay time, and sends the first control signal to the resonant controller chip, so as for the resonant controller chip to turn off the converter immediately. The short-circuit protection circuit, which is parallel-connected to the overload delay circuit, receives the DC detection level from the voltage sensing circuit, generates a second control signal when the DC detection level exceeds a second reference level, and sends the second control signal to the resonant controller chip, so that the resonant controller chip controls the primary-side power switches according to the second control signal and thereby turns off the converter immediately. The second reference level is higher than the first reference level and represents a short circuit at the load on the secondary side of the transformer. Hence, the series resonant converter of the present invention can output different currents according to the magnitude of the load on the secondary side and maintain stable operation for a predetermined delay time even if the secondary side is overloaded. However, once the secondary side is short-circuited, the converter is turned off instantly. Thus, the series resonant converter is effectively prevented from damage which may otherwise result from sustained overload or short circuit.

BRIEF DESCRIPTION OF THE SEVERAL VIEWS OF THE DRAWINGS

The invention as well as a preferred mode of use, further objects, and advantages thereof will be best understood by referring to the following detailed description of illustrative embodiments in conjunction with the accompanying drawings, in which.

DETAILED DESCRIPTION OF THE INVENTION

Figure 5:
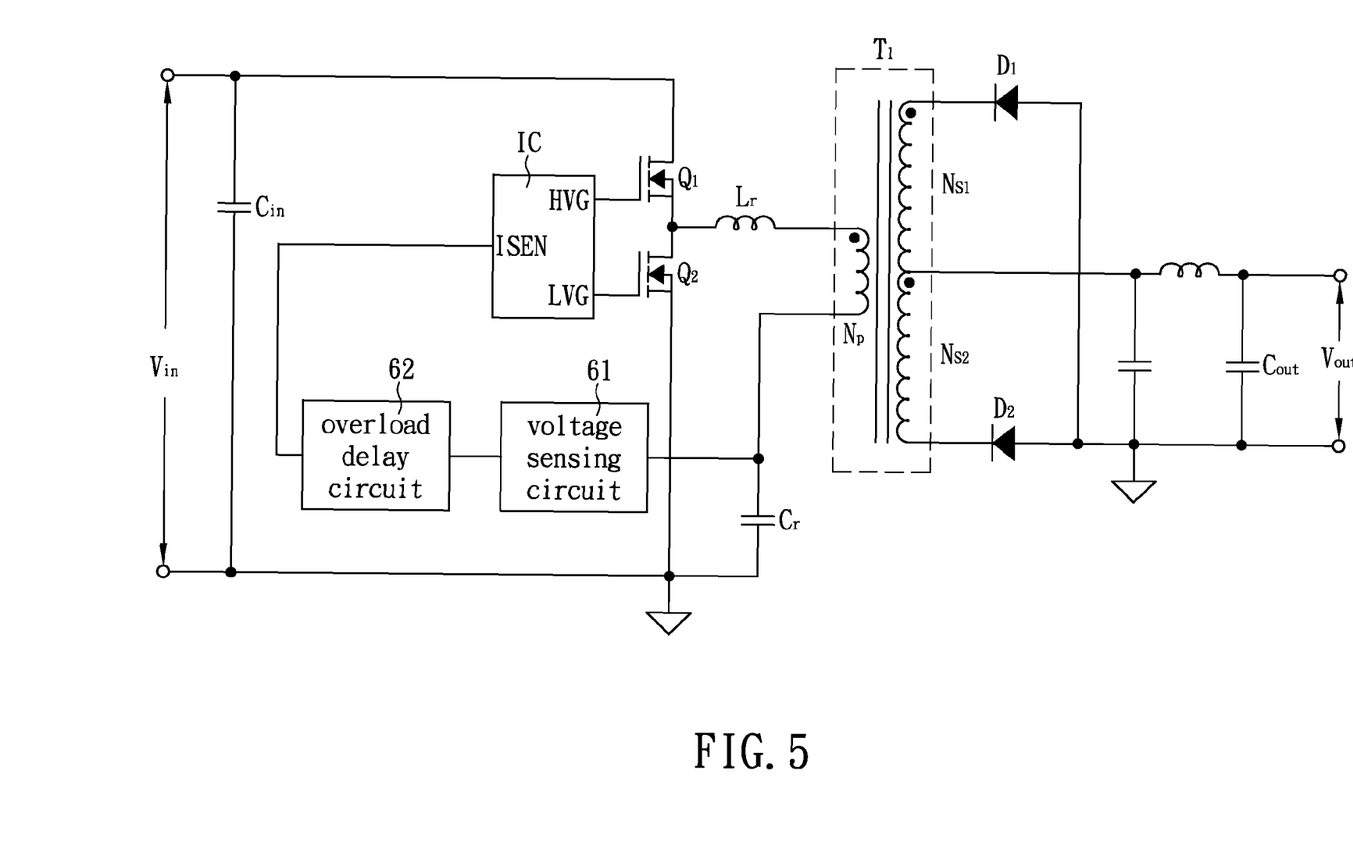
FIG. 5 is a schematic circuit diagram of a first preferred embodiment of the present invention.

The first preferred embodiment of the present invention is a series resonant converter with an overload delay mechanism, as shown in FIG. 5. The series resonant converter includes an input voltage filter capacitor $C_{in}$; a resonant controller chip IC; two primary-side power switches (including a first power switch $Q_1$ and a second power switch $Q_2$); a resonant inductor $L_r$; a resonant capacitor $C_r$; a voltage sensing circuit 61; an overload delay circuit 62; a transformer $T_1$; two secondary rectifier diodes $D_1$, $D_2$; and an output voltage filter capacitor $C_{out}$. The input voltage filter capacitor $C_{in}$ is connected across the positive and negative ends of a DC input voltage $V_{in}$. The input voltage filter capacitor $C_{in}$ is also parallel-connected to the first power switch $Q_1$ and the second power switch $Q_2$, which are series-connected to each other. The gate of the first power switch $Q_1$ and the gate of the second power switch $Q_2$ are connected respectively to the corresponding control pins HVG; LUG of the resonant controller chip IC (exemplified herein by the high-voltage resonant controller ST L6599A manufactured by STMicroelectronics). The first power switch $Q_1$ has its drain connected to the positive electrode of the input voltage filter capacitor $C_{in}$ and its source to the drain of the second power switch $Q_2$, while the source of the second power switch $Q_2$ is connected to the negative electrode of the input voltage filter capacitor $C_{in}$. Thus, the input voltage filter capacitor $C_{in}$ can provide a stable input voltage to the transformer $T_1$. The transformer $T_1$ is configured mainly for isolation and is provided with a primary winding $N_p$ and two secondary windings $N_{S1}$, $N_{S2}$. The primary winding $N_p$ has one end connected to the positive electrode of the resonant capacitor $C_r$ and the other end connected via the resonant inductor $L_r$ to the line between the two power switches $Q_1$, $Q_2$. The negative electrode of the resonant capacitor $C_r$ is connected to the source of the second power switch $Q_2$. The voltage sensing circuit 61 is connected to the line between the resonant capacitor $C_r$ and the primary winding $N_p$ and is configured for sensing a voltage ripple level of the resonant capacitor $C_r$ and generating a DC detection level accordingly, wherein the voltage ripple level corresponds to the load on the secondary side. The overload delay circuit 62 is connected to the voltage sensing circuit 61 and an over-current detection pin ISEN of the resonant controller chip IC, respectively, and is configured to receive the DC detection level from the voltage sensing circuit 61, start timing upon determining that the DC detection level exceeds a first reference level, generate a first control signal when the DC detection level has exceeded the first reference level for a predetermined delay time, and send the first control signal to the over-current detection pin ISEN. The resonant controller chip IC controls the two power switches $Q_1$, $Q_2$ according to the first control signal so as to turn off the converter immediately and thereby prevent the converter from overheating or damage which may otherwise result from sustained overload past the predetermined delay time. Hence, during the predetermined delay time, the resonant controller chip continuously controls the operating frequencies of the primary-side power switches to maintain the output power of the transformer, thus allowing an electronic instrument installed with the series resonant converter of the present invention to successfully and temporarily start and finish a particular peak-load function. However, once the predetermined delay time is up, and if the DC detection level still exceeds the first reference level, the resonant controller chip IC will immediately turn off the converter according to the first control signal sent from the overload delay circuit 62, thereby preventing the converter from overheating or damage attributable to sustained overload.

In the first embodiment, the secondary winding $N_{S1}$ has one end connected to the positive electrode of the output voltage filter capacitor $C_{out}$ and the other end to the negative end of the secondary rectifier diode $D_1$. Similarly, the secondary winding $N_{S2}$ has one end connected to the positive electrode of the output voltage filter capacitor $C_{out}$ and the other end to the negative end of the secondary rectifier diode $D_2$. Meanwhile, the positive ends of the secondary rectifier diodes $D_1$, $D_2$ are connected to the negative electrode of the output voltage filter capacitor $C_{out}$ respectively. As such, the output voltage filter capacitor $C_{out}$ can provide a stable DC output voltage $V_{out}$ to the load connected across the output ends. It should be pointed out that the secondary rectifier diodes $D_1$, $D_2$ in the first embodiment may also be other synchronous rectifiers that are equivalent to rectifier diodes.

While FIG. 5 shows the first preferred embodiment of the present invention, implementation of the present invention is not limited or restricted thereby. The primary- or secondary-side circuitry of the series resonant converter can be modified according to practical needs. However, no matter how the primary- or secondary-side circuitry of the series resonant converter is modified, the circuit structure to be protected by the patent, if granted, of the present invention is directed to a circuit applicable to a series resonant converter. Therefore, a person skilled in the design of series resonant converters may follow the design principles of the present invention and add a different overload delay circuit 62 and a different voltage sensing circuit 61 to a series resonant converter without departing from the scope of the present invention, provided that the voltage sensing circuit 61 can sense a voltage ripple level of a resonant capacitor $C_r$ series-connected on the primary side of a transformer $T_1$ and generate a DC detection level accordingly, and the overload delay circuit 62 can receive the DC detection level, start timing upon determining that the DC detection level exceeds a first reference level, generate a first control signal when the DC detection level has exceeded the first reference level for a predetermined delay time, and send the first control signal to a resonant controller chip IC, so that the resonant controller chip IC controls two secondary-side power switches $Q_1$, $Q_2$ according to the first control signal, thereby turning off the converter immediately and preventing the converter from overheating or damage which may otherwise result from sustained overload beyond the predetermined delay time.

The voltage sensing circuit 61 in the present invention is provided for sensing the magnitude of load current on the secondary side. Instead of sensing the voltage ripple level of the resonant capacitor $C_r$ that corresponds to the load on the secondary side, the following three sensing aspects may also be employed to achieve the same purpose, as explained below with reference to FIGS. 6, 7, and 8.

Figure 6:
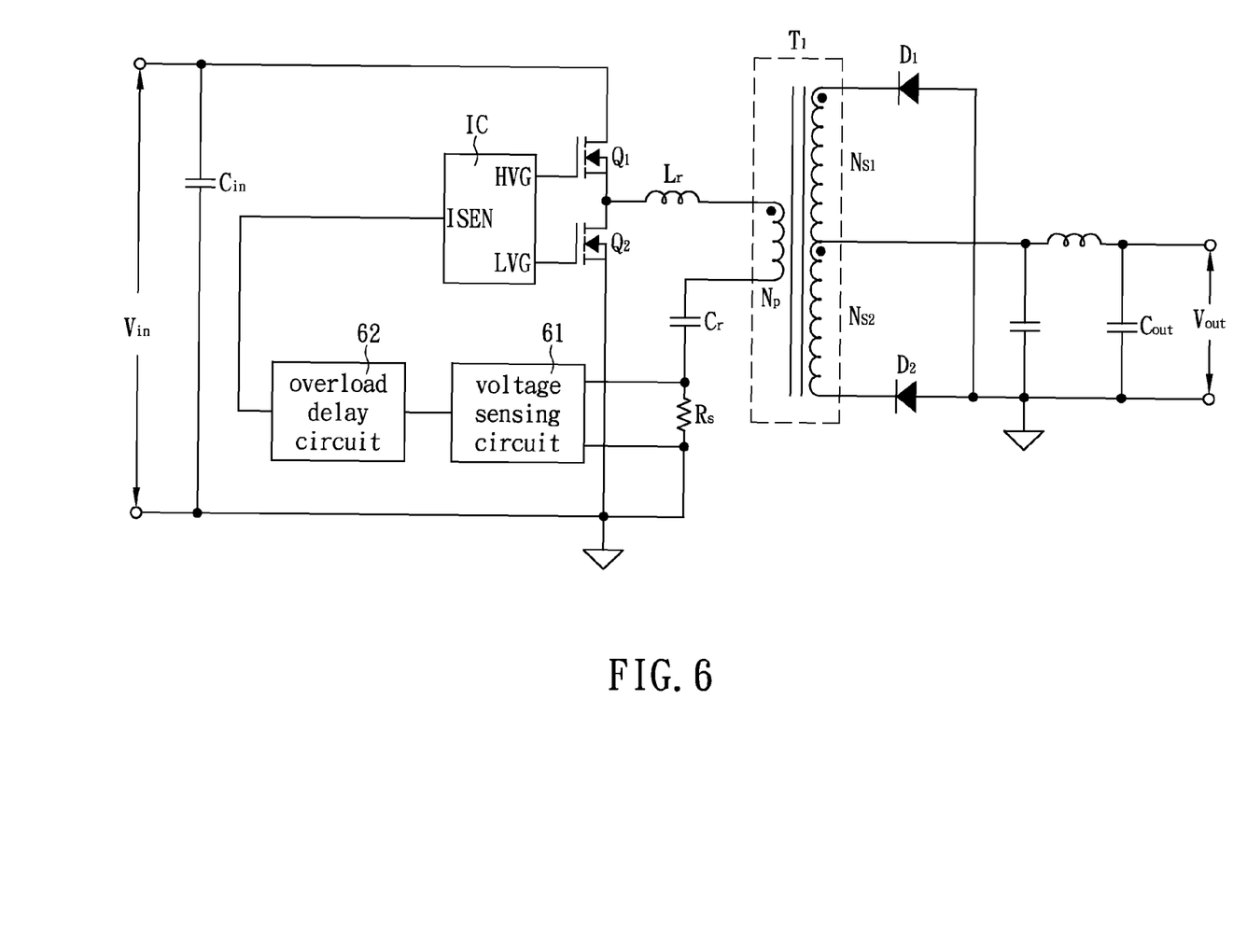
FIG. 6 is a schematic circuit diagram showing another sensing aspect of the first preferred embodiment of the present invention.

(1) Referring to FIG. 6, a sensing resistor $R_S$ is series-connected to the negative electrode of the resonant capacitor $C_r$ such that the voltage sensing circuit 61 is connected across the sensing resistor $R_S$ and can sample a voltage ripple level thereof that corresponds to the load on the secondary side.

Figure 7:
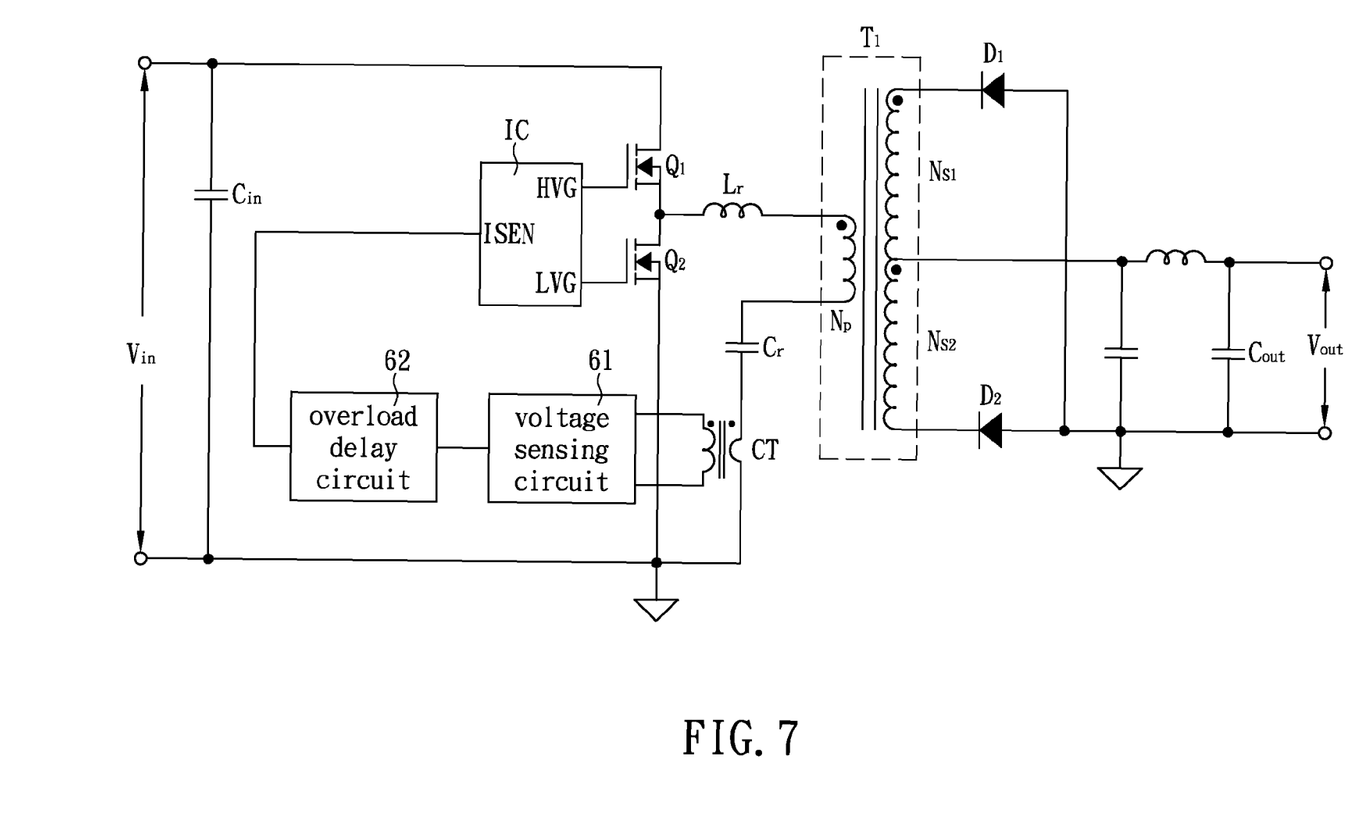
FIG. 7 is a schematic circuit diagram showing still another sensing aspect of the first preferred embodiment of the present invention.

(2) Referring to FIG. 7, a current transformer CT is series-connected to the negative electrode of the resonant capacitor $C_r$ such that the voltage sensing circuit 61 is connected across the current transformer CT and can sample a voltage ripple level thereof that corresponds to the load on the secondary side.

Figure 8:
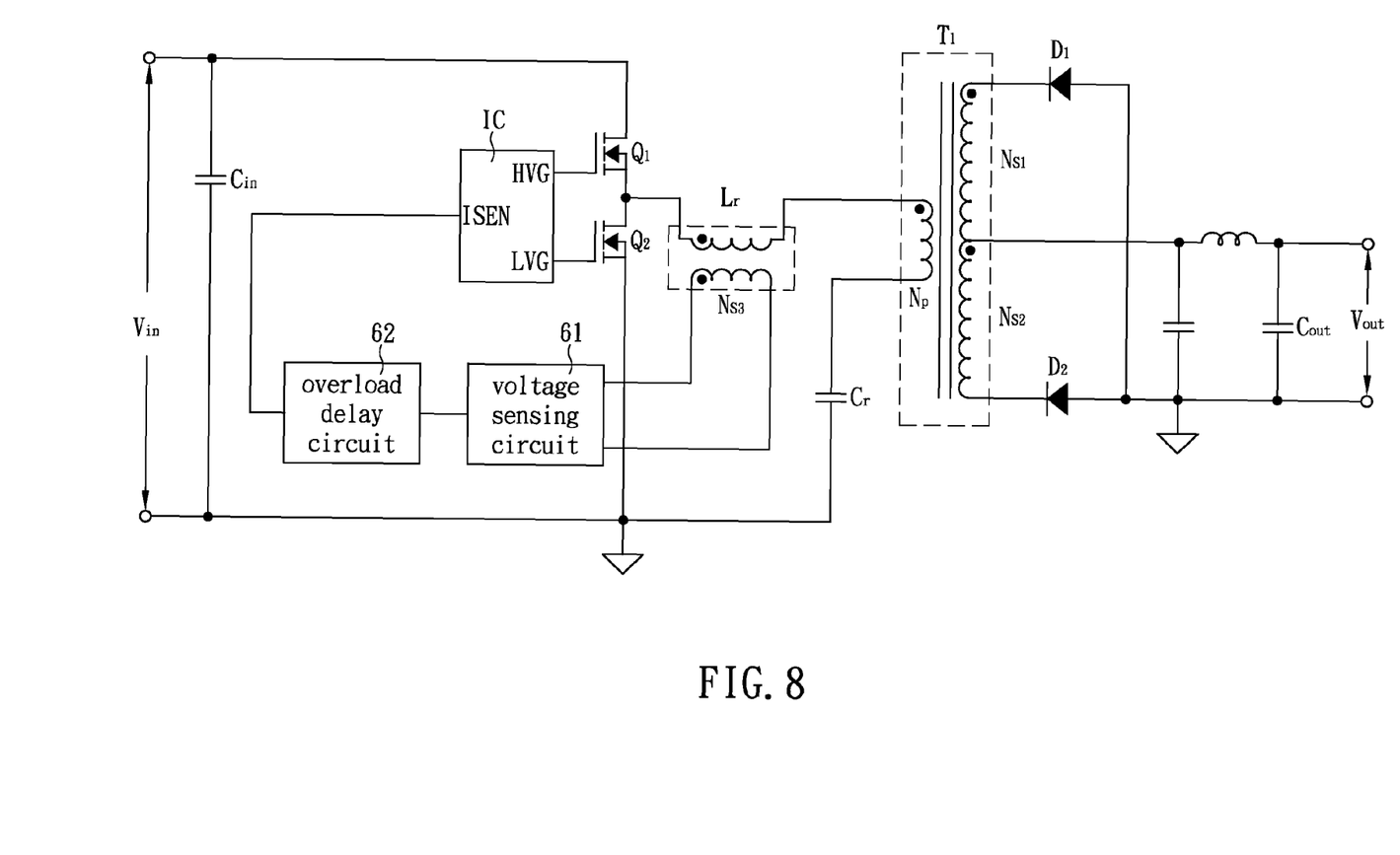
FIG. 8 is a schematic circuit diagram showing yet another sensing aspect of the first preferred embodiment of the present invention.

(3) Referring to FIG. 8, a secondary winding $N_{S3}$ is added to the resonant inductor $L_r$ such that the voltage sensing circuit 61 is connected across the secondary winding $N_{S3}$ and can sample a voltage ripple level thereof that corresponds to the load on the secondary side.

Figure 9:
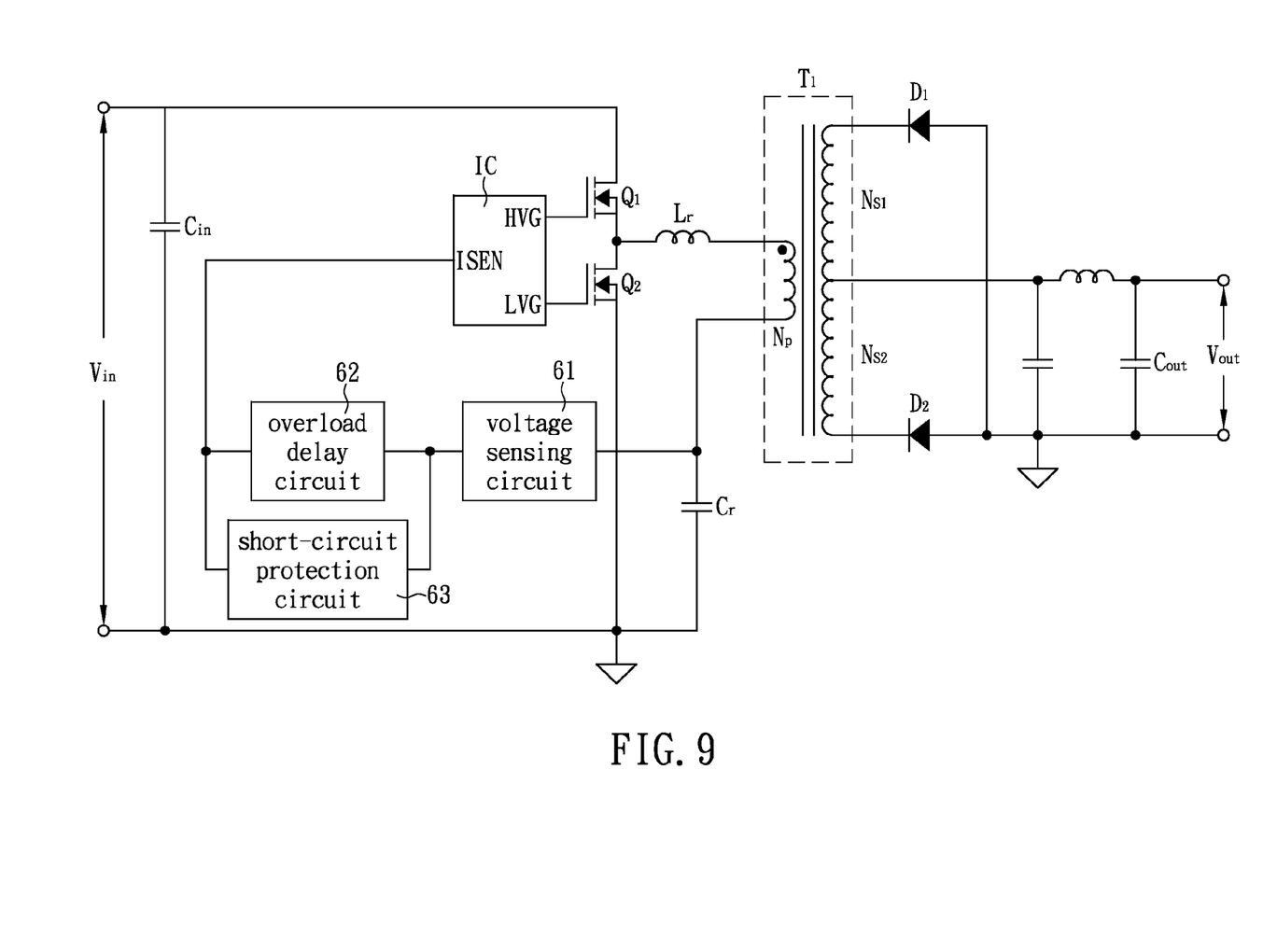
FIG. 9 is a schematic circuit diagram of a second preferred embodiment of the present invention.

The second preferred embodiment of the present invention is a series resonant converter with overload delay and short-circuit protection mechanisms, as shown in FIG. 9. This series resonant converter is similar to that shown in FIG. 5 except for an additional short-circuit protection circuit 63 parallel-connected to the overload delay circuit 62. The short-circuit protection circuit 63 is intended chiefly to prevent the series resonant converter from overheating or damage attributable to a short circuit at the load on the secondary side of the transformer $T_1$ during the predetermined delay time when the resonant controller chip continues controlling the operating frequencies of the primary-side power switches to maintain the output power of the transformer.

In the second embodiment, referring to FIG. 9, the short-circuit protection circuit 63 is parallel-connected to the overload delay circuit 62 and therefore can receive the DC detection level sent from the voltage sensing circuit 61. Upon determining that the DC detection level exceeds a second reference level, the short-circuit protection circuit 63 generates a second control signal, wherein the second reference level is higher than the first reference level and represents a short circuit at the load on the secondary side of the transformer $T_1$. After the short-circuit protection circuit 63 transmits the second control signal to the over-current detection pin ISSN of the resonant controller chip IC, the resonant controller chip IC controls the operating frequencies of the two power switches $Q_1$, $Q_2$ according to the second control signal and thereby turns off the converter immediately. Thus, the series resonant converter not only can output different currents to suit the magnitude of the load on the secondary side, but also can continue operating for a predetermined delay time even if the secondary side is overloaded. However, should the load on the secondary side be short-circuited, the converter is instantly turned off and hence effectively protected from overheating or damage which may otherwise result from the short circuit.

Figure 10:
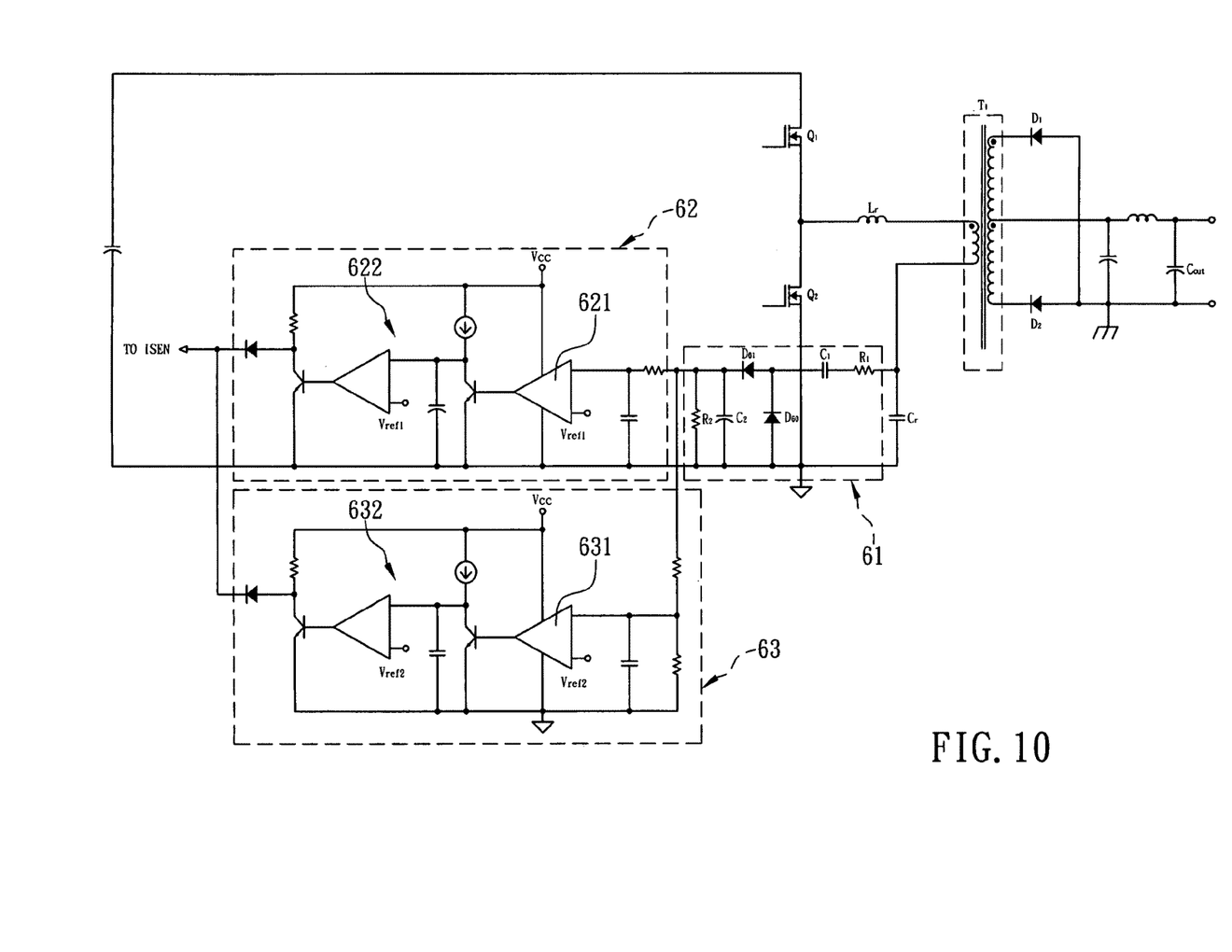
FIG. 10 is a detailed electronic circuit diagram of the embodiment shown in FIG. 9.

In order to verify the feasibility of the series resonant converter of the present invention, the inventor designed the circuit structure of FIG. 9 in detail and produced the electronic circuit diagram shown in FIG. 10 (in which the resonant controller chip is omitted for the sake of simplicity). More specifically, the voltage sensing circuit 61 uses a series-connected RC circuit (i.e., a resistor $R_1$ and a capacitor $C_1$) and a parallel-connected RC circuit (i.e., a resistor $R_2$ and a capacitor $C_2$) to sample the voltage ripple of the resonant capacitor $C_r$. The higher the load on the secondary side of the transformer $T_1$ is, the larger the sampled voltage ripple will be. Then, the voltage sensing circuit 61 uses two rectifier diodes $D_{60}$, $D_{61}$ to perform full-wave rectification on the sampled voltage ripple. Consequently, a DC detection level proportional to the magnitude of the load on the secondary side is obtained and sent to the overload delay circuit 62. The overload delay circuit 62 includes a first comparator 621 and a first delay timer 622. The first comparator 621 receives the DC detection level from the voltage sensing circuit 61 and, upon determining that the DC detection level exceeds a first reference level $V_{ref1}$, triggers the first delay timer 622 to start timing. The predetermined delay time is adjustable by varying the capacitance of the first delay timer 622. When the first delay timer 622 determines that the period for which the DC detection level exceeds the first reference level $V_{ref1}$ has reached the predetermined delay time, the first delay timer 622 generates and sends a first control signal to the over-current detection pin ISEN of the resonant controller chip IC. The resonant controller chip IC controls the operating frequencies of the two power switches $Q_1$, $Q_2$ according to the first control signal, and in consequence the converter is turned off immediately and prevented from overheating or damage attributable to sustained overload beyond the predetermined delay time.

Referring again to FIG. 10, the short-circuit protection circuit 63 includes a second comparator 631 and a second delay timer 632. The second comparator 631 receives the DC detection level from the voltage sensing circuit 61 and, upon determining that the DC detection level exceeds a second reference level $V_{ref2}$, triggers the second delay timer 632 to start timing. The second reference level $V_{ref2}$ is higher than the first reference level $V_{ref1}$ and indicates that the load on the secondary side of the transformer $T_1$ is short-circuited. The capacitance of the second delay timer 632 is so designed that, as soon as the DC detection level is determined to have exceeded the second reference level $V_{ref2}$, the second delay timer 632 generates and sends a second control signal to the over-current detection pin ISEN of the resonant controller chip IC. As a result, the resonant controller chip IC controls the operating frequencies of the two power switches $Q_1$, $Q_2$ according to the second control signal and thereby turns off the converter immediately to prevent it from overheating or damage attributable to the short circuit at the load on the secondary side.

Figure 11:
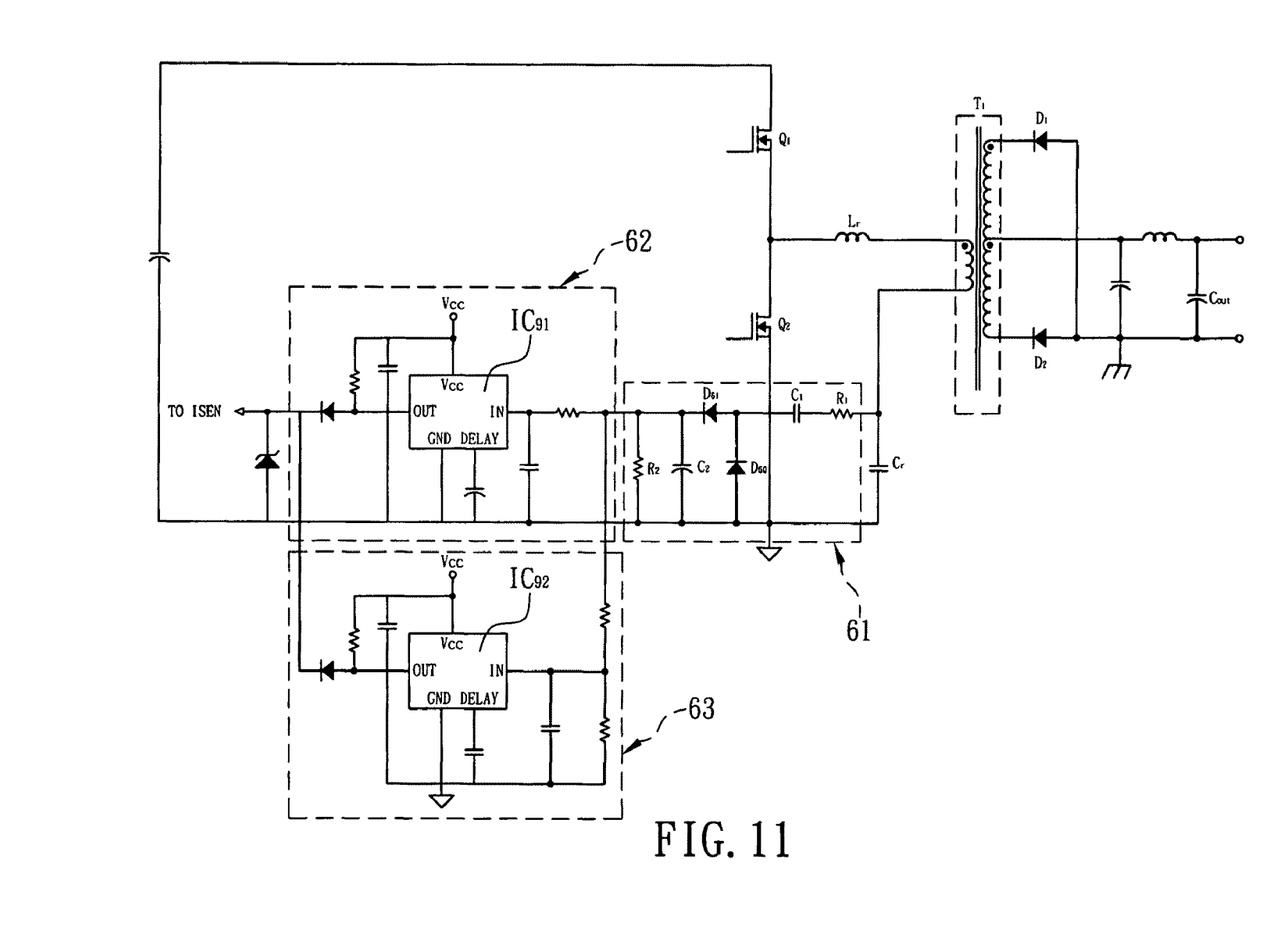
FIG. 11 shows a circuit actually made according to FIG. 10.
Figure 12:
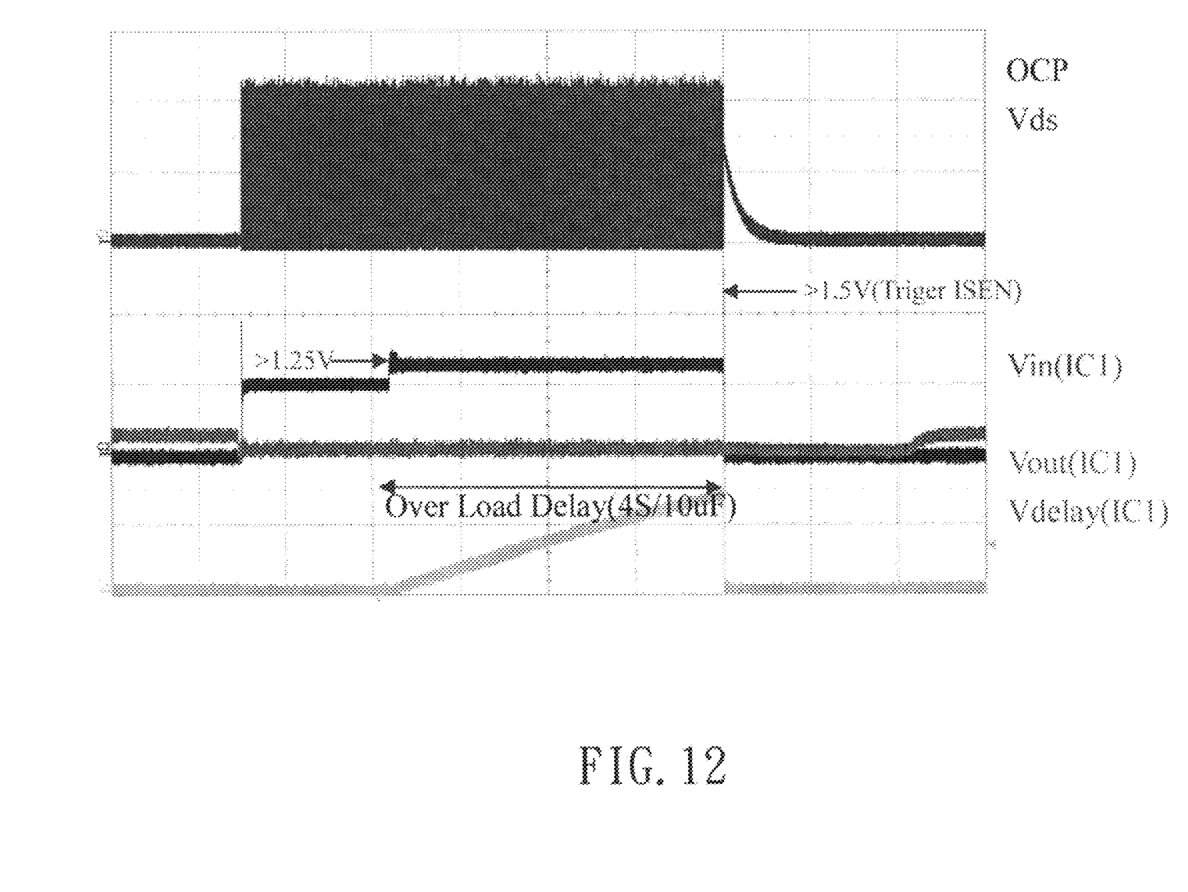
FIG. 12 is a waveform diagram based on actual measurements obtained from tests conducted on the series resonant converter shown in FIG. 11, wherein when a DC detection level exceeds a first reference level, a resonant controller chip holds the output power of a transformer for a predetermined delay time, and the resonant controller chip does not turn off the transformer until the predetermined delay time is up.
Figure 13:
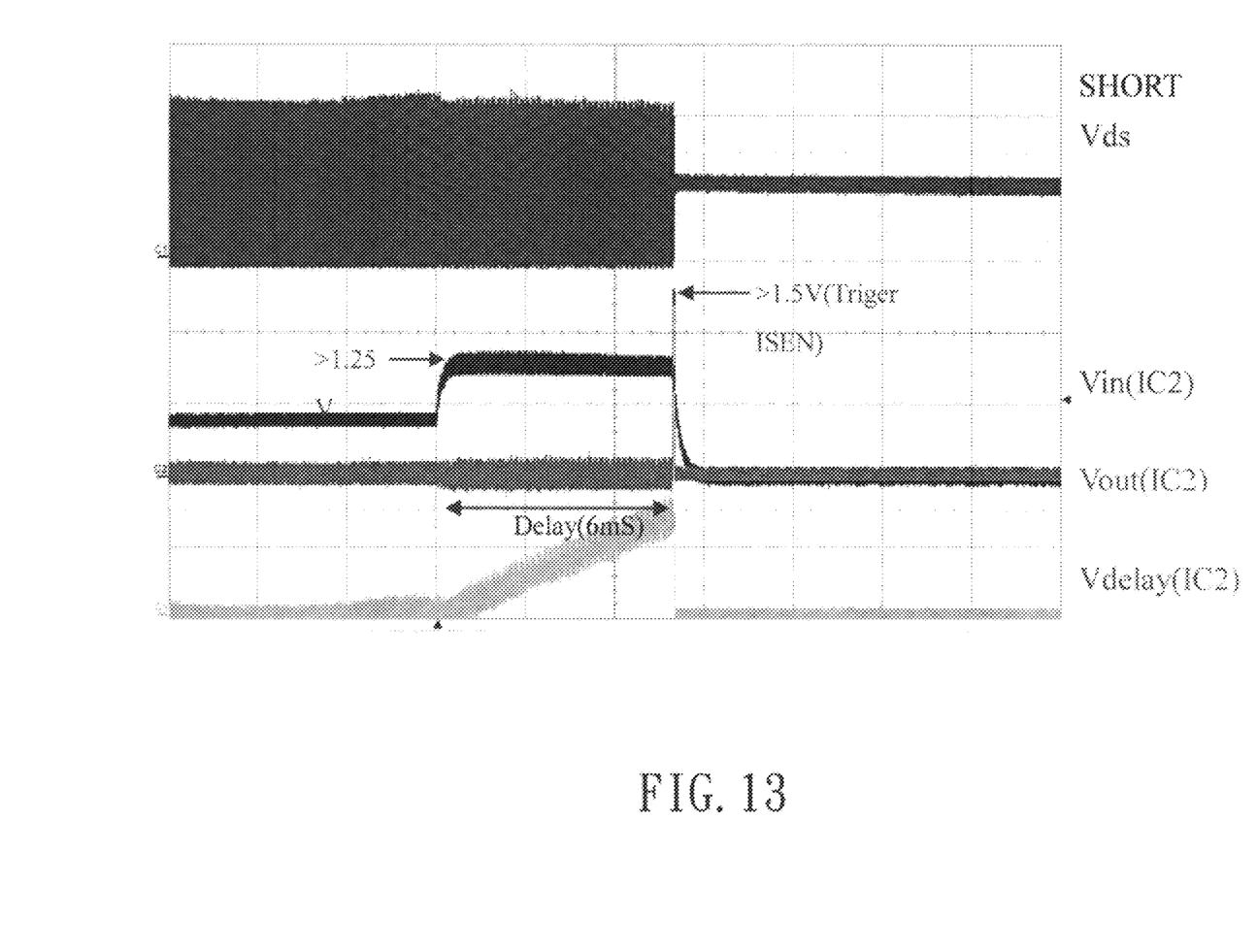
FIG. 13 is a waveform diagram based on actual measurements obtained from tests conducted on the series resonant converter shown in FIG. 11, wherein the resonant controller chip turns off the converter as soon as the DC detection level exceeds a second reference level.

To verify the performance of the series resonant converter of the present invention, a circuit was actually made by the inventor according to the detailed electronic circuit diagram of FIG. 10 and is shown in FIG. 11 (wherein the resonant controller chip is omitted for simplicity). The first comparator 621, the first delay timer 622, the second comparator 631, and the second delay timer 632 in the overload delay circuit 62 and the short-circuit protection circuit 63 of FIG. 10 were easily realized by commercially available and inexpensive timer chips $IC_{91}$, $IC_{92}$ having the same specifications (e.g., the timer chip M51957B manufactured by MITSUBISHI of Japan). The series resonant converter shown in FIG. 11 was tested, and actual measurements obtained, as presented in the waveform diagrams of FIGS. 12 and 13. Referring to FIG. 12, the overload delay circuit 62 (i.e., the timer chip $IC_{91}$) begins to time as soon as it determines that the DC detection level generated by the voltage sensing circuit 61 according to the voltage ripple level of the resonant capacitor $C_r$ exceeds the first reference level (i.e., 1.25V). When the DC detection level has exceeded the first reference level for the predetermined delay time, such as the 4-second delay time indicated in FIG. 12, the overload delay circuit 62 generates the first control signal, which is higher than 1.5V. Only after the resonant controller chip has maintained the output power of the transformer $T_1$ for the predetermined delay time does the resonant controller chip turn off the transformer $T_1$, thereby ensuring that the electronic instrument using the series resonant converter can successfully and temporarily start a particular peak-load function during the predetermined delay time. Furthermore, as shown in FIG. 13, once the short-circuit protection circuit 63 (i.e., the timer chip $IC_{92}$) determines that the DC detection level received from the voltage sensing circuit 61 exceeds the second reference level (which is higher than the first reference level), meaning that the load on the secondary side of the transformer is short-circuited, the short-circuit protection circuit 63 immediately generates the second control signal, which is also higher than 1.5V. As a result, the resonant controller chip turns off the converter instantly (in 6 millisecond) to ensure that the converter will not burn or be damaged due to the short circuit at the load on the secondary side. Therefore, the series resonant converter of the present invention not only can output different currents precisely according to the magnitude of the load on the secondary side, but also can maintain stable operation for a predetermined delay time even though the secondary side is overloaded. However, should the secondary side be short-circuited, the converter will be turned off at once. Thus, the series resonant converter of the present invention is safe from burning or damage which may otherwise occur due to sustained overload or a short circuit.

While the present invention has been described by reference to the preferred embodiments, it is understood that the embodiments disclosed herein are not intended to limit the scope of the present invention. For instance, the circuit design of the short-circuit protection circuit 63 may be modified according to practical needs. More particularly, it is feasible to omit the second delay timer 632 and use only the second comparator 631, wherein the second comparator 631 is configured to receive the DC detection level from the voltage sensing circuit 61 and, when the DC detection level exceeds the second reference level, directly generate the second control signal, so as for the resonant controller chip IC to turn off the transformer $T_1$ immediately.

What is claimed is:

1. A series resonant converter with overload delay and short-circuit protection mechanisms, comprising:
    a transformer whose primary side is provided with a primary winding for receiving a DC input voltage and whose secondary side is provided with two secondary windings for providing a DC output voltage;
    two primary-side power switches connected on the primary side and including a first power switch and a second power switch, wherein the first power switch and the second power switch are series-connected;
    a resonant controller chip having two control pins connected to a gate of the first power switch and a gate of the second power switch, respectively;
    a resonant capacitor having an end connected to a first end of the primary winding and an opposite end connected to a source of the second power switch;
    a resonant inductor having an end connected to a second end of the primary winding and an opposite end connected to a line between the first power switch and the second power switch;
    a voltage sensing circuit connected to the primary side and configured to sample a voltage ripple level on the primary side of the transformer that corresponds to a load on the secondary side and generate a DC detection level accordingly;
    an overload delay circuit connected to the voltage sensing circuit and an over-current detection pin of the resonant controller chip, respectively, and configured to receive the DC detection level from the voltage sensing circuit, start timing upon determining that the DC detection level exceeds a first reference level, generate a first control signal when the DC detection level has exceeded the first reference level for a predetermined delay time, and send the first control signal to the over-current detection pin, so as for the resonant controller chip to turn off the converter immediately; and a short-circuit protection circuit parallel-connected to the overload delay circuit and configured to receive the DC detection level from the voltage sensing circuit, generate a second control signal upon determining that the DC detection level exceeds a second reference level, and send the second control signal to the over-current detection pin of the resonant controller chip, so as for the resonant controller chip to turn off the transformer immediately, wherein the second reference level is higher than the first reference level and represents a short circuit at the load on the secondary side of the transformer.

2. The series resonant converter of claim 1, further comprising an input voltage filter capacitor connected across the DC input voltage and parallel-connected to the series-connected first and second power switches.

3. The series resonant converter of claim 2, further comprising:

an output voltage filter capacitor having a first end connected to first ends of the two secondary windings, respectively; and two secondary rectifier diodes or synchronous rectifiers, each said secondary rectifier diode or synchronous rectifier having an end connected to a second end of a corresponding said secondary winding and an opposite end connected to a second end of the output voltage filter capacitor, so as for the output voltage filter capacitor to provide the DC output voltage.

4. The series resonant converter of claim 3, wherein the voltage sensing circuit comprises two rectifier diodes for performing full-wave rectification on the sampled voltage ripple level so as to obtain the DC detection level, which is proportional to the magnitude of the load on the secondary side, and sending the DC detection level to the overload delay circuit.

5. The series resonant converter of claim 4, wherein the overload delay circuit comprises a first comparator and a first delay timer, in which the first comparator, upon receiving the DC detection level from the voltage sensing circuit and determining that the DC detection level exceeds the first reference level, triggers the first delay timer to start timing, and the first delay timer, upon determining that the period for which the DC detection level exceeds the first reference level has reached the predetermined delay time, generates the first control signal immediately.

6. The series resonant converter of claim 5, wherein the short-circuit protection circuit comprises a second comparator which, upon receiving the DC detection level from the voltage sensing circuit and determining that the DC detection level exceeds the second reference level, generates the second control signal immediately.

7. The series resonant converter of claim 6, wherein the voltage sensing circuit is connected to a line between the resonant capacitor and the primary winding so as to sample a voltage ripple level of the resonant capacitor that corresponds to the load on the secondary side and generate the DC detection level accordingly.

8. The series resonant converter of claim 6, further comprising a sensing resistor series-connected to the resonant capacitor such that the voltage sensing circuit is connected across the sensing resistor so as to sample a voltage ripple level thereof that corresponds to the load on the secondary side and generate the DC detection level accordingly.

9. The series resonant converter of claim 6, further comprising a current transformer series-connected to the resonant capacitor such that the voltage sensing circuit is connected across the current transformer so as to sample a voltage ripple level thereof that corresponds to the load on the secondary side and generate the DC detection level accordingly.

10. The series resonant converter of claim 6, further comprising a secondary winding provided on the resonant inductor such that the voltage sensing circuit is connected across the secondary winding so as to sample a voltage ripple level thereof that corresponds to the load on the secondary side and generate the DC detection level accordingly.

11. The series resonant converter of claim 5, wherein the short-circuit protection circuit comprises a second comparator and a second delay timer, and the second comparator, upon receiving the DC detection level from the voltage sensing circuit and determining that the DC detection level exceeds the second reference level, triggers the second delay timer to generate the second control signal immediately.

12. The series resonant converter of claim 11, wherein the voltage sensing circuit is connected to a line between the resonant capacitor and the primary winding so as to sample a voltage ripple level of the resonant capacitor that corresponds to the load on the secondary side and generate the DC detection level accordingly.

13. The series resonant converter of claim 11, further comprising a sensing resistor series-connected to the resonant capacitor such that the voltage sensing circuit is connected across the sensing resistor so as to sample a voltage ripple level thereof that corresponds to the load on the secondary side and generate the DC detection level accordingly.

14. The series resonant converter of claim 11, further comprising a current transformer series-connected to the resonant capacitor such that the voltage sensing circuit is connected across the current transformer so as to sample a voltage ripple level thereof that corresponds to the load on the secondary side and generate the DC detection level accordingly.

15. The series resonant converter of claim 11, further comprising a secondary winding provided on the resonant inductor such that the voltage sensing circuit is connected across the secondary winding so as to sample a voltage ripple level thereof that corresponds to the load on the secondary side and generate the DC detection level accordingly.

* * * * *